Feb. 15, 1927.
E. B. HUTCHINS
1,618,152
VEHICLE VENTILATING APPARATUS
Filed March 18, 1926    2 Sheets-Sheet 1
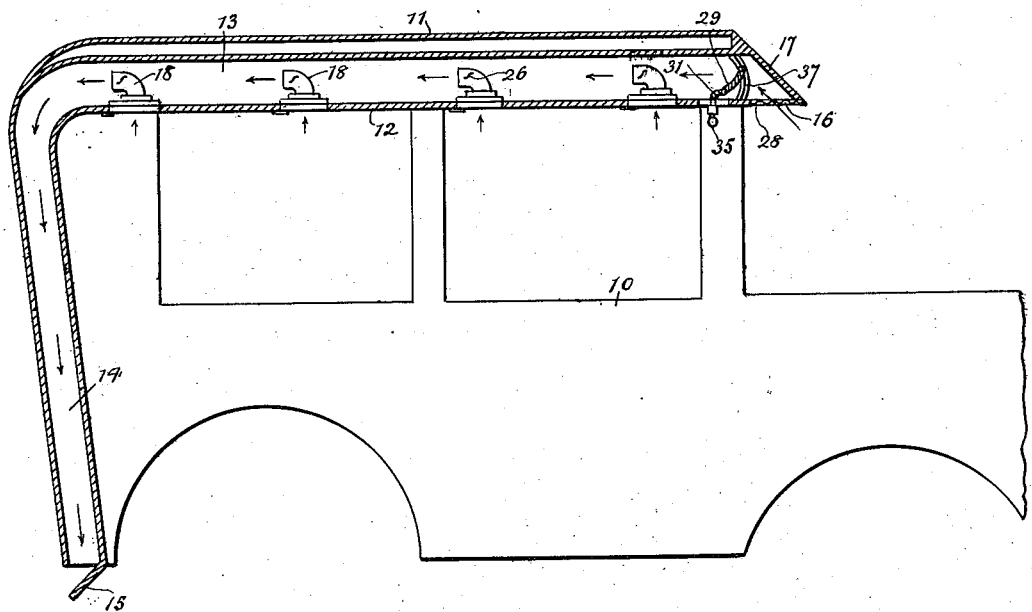
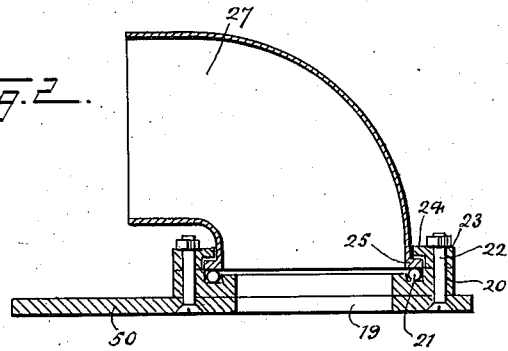
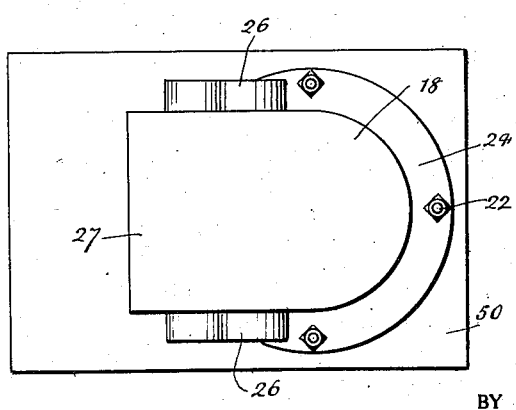

Feb. 15, 1927.
E. B. HUTCHINS
1,618,152
VEHICLE VENTILATING APPARATUS
Filed March 18, 1926   2 Sheets-Sheet 2
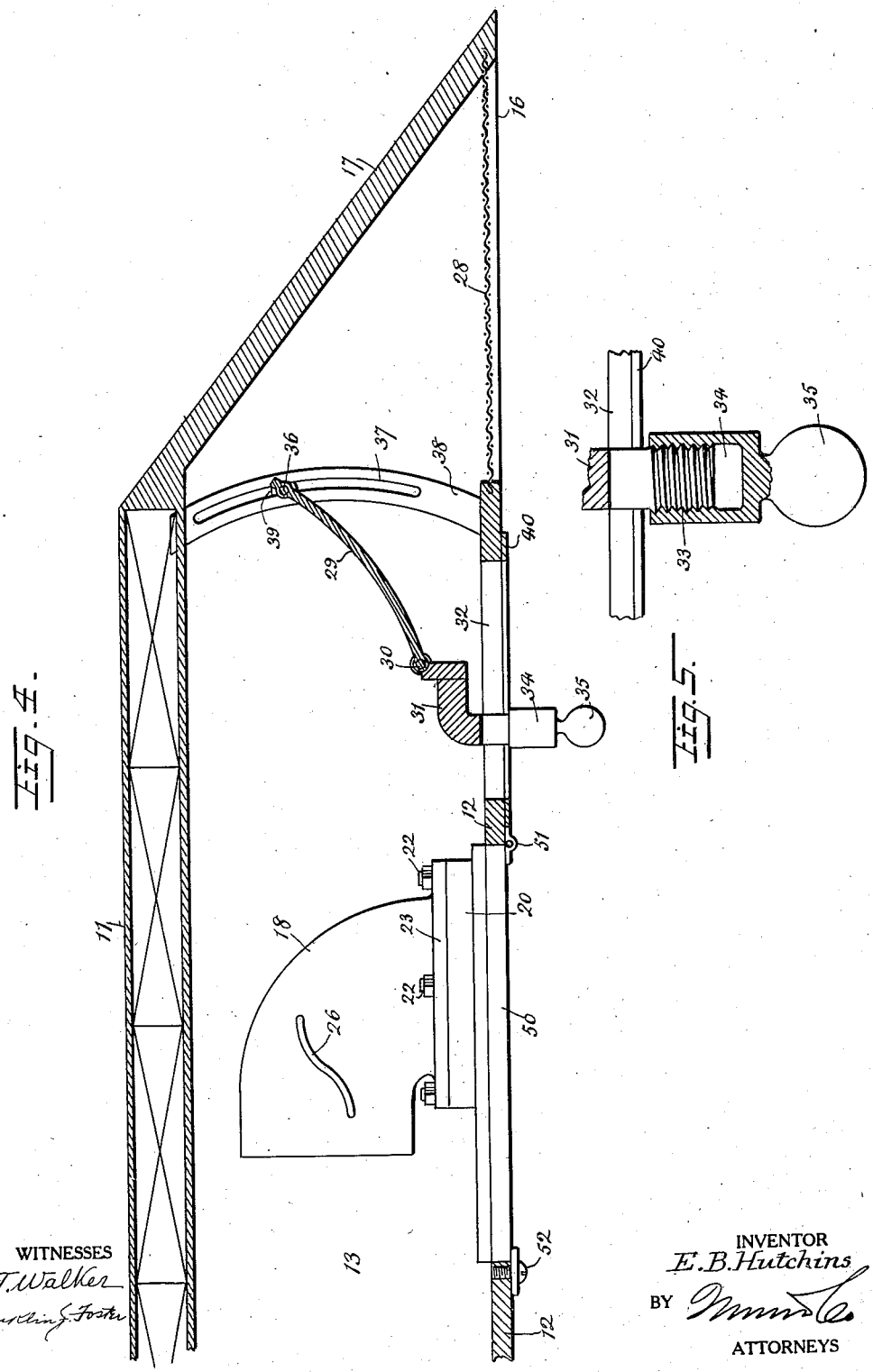

Patented Feb. 15, 1927.

1,618,152

UNITED STATES PATENT OFFICE.

ERNEST B. HUTCHINS, OF BANGOR, MAINE.

VEHICLE VENTILATING APPARATUS.

Application filed March 18, 1926. Serial No. 95,774.

The present invention is concerned with the provision of apparatus for ventilating closed vehicles and in its broader aspects relates to the ventilation of any vehicle, such for instance as railway cars, trolley cars or automobiles. The invention finds its preferred embodiment however, as a means for ventilating closed automotive vehicles.

An object of the invention is to assure the continuous removal of vitiated air from the passenger compartment of the vehicle and the continued inflow of fresh air without causing a noticeable draft in the passenger compartment, and without the common annoyance of the audible whistling of the air currents through the ventilators.

A further object of the invention is to provide a ventilating apparatus for automotive vehicles which may be conveniently manually regulated by the driver of the car to control the rate of exhaust of the vitiated air. Other objects of the invention are to provide a ventilating apparatus of this character capable of a wide range of utility, which will be of simple, practical construction, which will be rugged, durable and efficient in use, which may be manufactured with comparative economy, and which will necessitate no material changes in the construction of the vehicle to which it may be applied.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a somewhat diagrammatic fragmentary view in longitudinal section through an automotive vehicle showing a ventilating apparatus embodying the present invention installed therein.

Fig. 2 is an enlarged vertical sectional view through one of the ventilating funnels.

Fig. 3 is a top plan view of Fig. 2.

Fig. 4 is an enlarged sectional detail view through the forward end of the top of the car.

Fig. 5 is a sectional detail illustrating the connection of the window operating knob with its associated operating bar.

While I have shown the invention as applied to an automotive vehicle, it is to be understood that the drawings merely illustrate one form which the invention may take, and are not to be construed in a limiting sense.

In the drawings I have used the reference character 10 to designate the body of an automotive vehicle covered by a hollow top including a roof 11 and a ceiling 12 spaced from each other to define an air circulating compartment 13 between them which extends approximately the full length of the car. Air compartment 13 communicates at its rear end with a vertical air discharge passage 14 at the rear of the car from which vitiated air passes over a deflector 15 to exhaust.

The forward end of the compartment 13 communicates with an inlet opening 16 disposed under the usual vizor 17 of the car.
The vizor serves to effectively trap air and force it into the chamber 13, and the deflector 15 acts to create a suction immediately behind it when the car is in motion, so that air is in effect, positively forced into the chamber 13 and positively withdrawn therefrom.

The passenger compartment of the car communicates with the air chamber 13 by series of funnels or elbows 18, the vertical portions of which align with openings 19 in the ceiling of the car. Aligned with the edges of the openings 19 are annular raceways 20 for ball bearings 21. Bolts or equivalent securing devices 22 which retain the raceways 20 in place, also serve to clamp guide rings 23 formed with inwardly overhanging lips 24 which prevent upward movement of the external flanges 25 at the lower ends of the funnels 18. Flanges 25 ride directly on the bearings 21, and external fins or blades 26 on the funnels are acted upon by the air current passing through the chamber 13 to maintain them with their horizontal portions 27 facing rearwardly.

As a matter of fact, in automotive vehicle construction, the ball bearings 21 may frequently prove unnecessary. They are primarily desirable in use of railway cars or the like in which either end may be the head end, and in which air currents may flow in either direction through the chamber 13 depending upon the direction in which the car is moving.

The forward edge of the vizor 17 is preferably disposed in approximately the same horizontal plane as the ceiling 12, and a screen 28 may be conveniently stretched across the opening 16 to exclude insects or other foreign matter from entering the front end of the air chamber 13. Some means is provided for regulating the amount of air which enters the forward end of the air chamber 13. I have shown one convenient means for accomplishing this purpose, which includes one or a series of adjustable windows or dampers 29 capable of being locked in any desired position of adjustment.

As illustrated, the dampers 29 are pivotally connected at their lower ends by pivot pins 30 to carriages 31. The carriages 31 are slidable in longitudinally extending slots 32 in the ceiling of the vehicle and carry depending threaded stems 33 receiving the threaded socket portions 34 of operating knobs 35. The dampers 29 are preferably slightly curved, and at their forward ends carry a transverse pivot bar 36 working in arcuate slots 37 in arcuate guiding arms 38 fixed between the ceiling and roof. Preferably the ends of the pivot bars 36 carry rollers 39.

The dampers 29 may be locked in any position of adjustment by the simple expedient of screwing the knob 35 home until it engages the under wall of the ceiling 12, or engages a reinforcing plate 40 around the slots 32 in the ceiling. To effect adjustment of the window, the driver of a car partially unscrews the knob 35 and uses it as a handle to slide carriage 31 back and forth in the slot 32 until the dampers 29 have been opened or closed to the desired extent.

While the particular manner of mounting the ventilating funnels is subject to a wide variety of variations I prefer to make them readily removable by mounting them on pivoted sections 50 of the ceiling 12. These sections 50 are preferably hinged at 51 and retained in place by flanged screws 52. By removing the screw, the hinged section 50 will swing downwardly carrying with it the ventilating funnels, and the funnels may thus be conveniently replaced and conveniently originally assembled during the construction of the machine.

The operation of the device is substantially as follows. The driver as above noted, may adjust the dampers 29 to regulate the draft of air which enters the forward end of the chamber 13. The fresh air flowing from the front to the rear of this chamber acts on the injector member to reduce air pressures at the discharge ends of the funnels, thereby inducing a flow of vitiated air from the passenger compartment through the funnels to the air chamber 13. Vitiated air is thus carried along with the air current and discharged over the deflector 15 at the rear of the car. In most automobile or other closed vehicle constructions, there are enough places for an air leak to occur in order to assure a constant supply of fresh air as the vitiated air is removed. In the present construction, the slot or slots 32, as the case may be, afford one convenient entrance for fresh air.

In installing this system on vehicles other than automotive vehicles, it will be evident that certain changes and modifications may be necessary. However, various slight changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. The combination with a closed vehicle having an air space between its ceiling and roof, of means for inducing a fore and aft current of air to flow through said air space when the vehicle is in motion, means whereby the air current exhausts vitiated air from the passenger compartment of the vehicle, means for regulating the volume of air entering the air space, including a damper controlling the air inlet, and means for locking the damper in various positions of adjustment, guide rails in the chamber in which one edge of the damper is pivotally and slidably mounted, a travelling carriage guided for movement in the ceiling and pivotally connected to the other edge of the damper, and handle means extending through the ceiling for manipulating the carriage from the passenger compartment of the cab.

2. The device described in claim 1, wherein the manipulating means includes a threaded extension on the carriage working in a slot in the ceiling, said handle means on the extension being adjustable to engage the ceiling and lock the carriage and damper against movement.

3. The combination with a closed vehicle having an air space between its ceiling and roof, of means for inducing a fore and aft current of air to flow through said air space when the vehicle is in motion, and means whereby the air current exhausts vitiated air from the passenger compartment of the vehicle, including a series of funnels communicating with the compartment and having horizontal discharge ends located in the air chamber, hinged plates constituting sections of the ceiling, said funnels being rotatably mounted on the plate.

4. The combination with a closed vehicle having an air space between its ceiling and roof, of means for inducing a fore and aft current of air to flow through said space when the vehicle is in motion, means whereby the air current removes vitiated air from the passenger compartment of the vehicle, a damper controlling the inlet to the air space, guide rails in the open space and devices at one edge of the damper secured in the guide rails, a carriage guided for movement in the ceiling and connected to the other edge of the damper, and means for manually shifting the carriage to adjust the damper.

ERNEST B. HUTCHINS.